US008472373B2

(12) United States Patent
Hsu et al.

(10) Patent No.: US 8,472,373 B2
(45) Date of Patent: Jun. 25, 2013

(54) METHOD FOR BACKGROUND SCAN IN A MOBILE WIRELESS SYSTEM

(75) Inventors: Hong-Kai Hsu, Taipei County (TW); Hsien-Chang Liu, Nantou County (TW); Yu Hsiang Lin, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1355 days.

(21) Appl. No.: 11/774,755

(22) Filed: Jul. 9, 2007

(65) Prior Publication Data

US 2008/0096572 A1  Apr. 24, 2008

Related U.S. Application Data

(60) Provisional application No. 60/829,884, filed on Oct. 18, 2006.

(51) Int. Cl.
*H04W 4/00* (2009.01)
*H04W 72/00* (2009.01)
*H04B 7/00* (2006.01)

(52) U.S. Cl.
USPC ........... 370/328; 370/310; 370/318; 455/434; 455/450

(58) Field of Classification Search
USPC ............... 455/434–437, 422.1; 370/318, 310, 370/328
See application file for complete search history.

(56) References Cited

U.S. PATENT DOCUMENTS

| | | | |
|---|---|---|---|
| 6,278,877 B1* | 8/2001 | Brederveld et al. | 455/434 |
| 6,580,700 B1* | 6/2003 | Pinard et al. | 370/332 |
| 2004/0043767 A1* | 3/2004 | Tsutsumi et al. | 455/432.1 |
| 2005/0107088 A1* | 5/2005 | Oura | 455/450 |
| 2005/0245269 A1 | 11/2005 | Demirhan et al. | |
| 2006/0040662 A1* | 2/2006 | Kim et al. | 455/434 |
| 2006/0079232 A1* | 4/2006 | Omori et al. | 455/436 |
| 2006/0171304 A1* | 8/2006 | Hill et al. | 370/228 |
| 2007/0009065 A1* | 1/2007 | Kuo et al. | 375/316 |
| 2007/0263558 A1* | 11/2007 | Salomone | 370/318 |

OTHER PUBLICATIONS

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Std 802.16e-2005, Feb. 28, 2006.
Annex D; Messages Sequence Charts (MSCs); D.1 Handover MSCs; D.1.1 Neighbor BS Advertisement and Scanning IEEE Std 802.16e-2005, Feb. 28, 2006.

* cited by examiner

*Primary Examiner* — Wesley Kim
(74) *Attorney, Agent, or Firm* — McClure, Qualey & Rodack, LLP

(57) ABSTRACT

A method is disclosed, operating a mobile station in a wireless network system comprising a plurality of base stations allocated in N channels. Data packets are received at a time interval p from a first base station of the wireless network system to which the mobile station is currently connected. A first period T is provided for a complete background scan monitoring messages from the plurality of base stations located in the wireless network system. The complete background scan is divided into a plurality of partial scan sections, each of which monitors base stations of one of the N channels. A second period M is determined for the partial scan section according to the time interval p, the first period T, and the number of channels N.

12 Claims, 7 Drawing Sheets

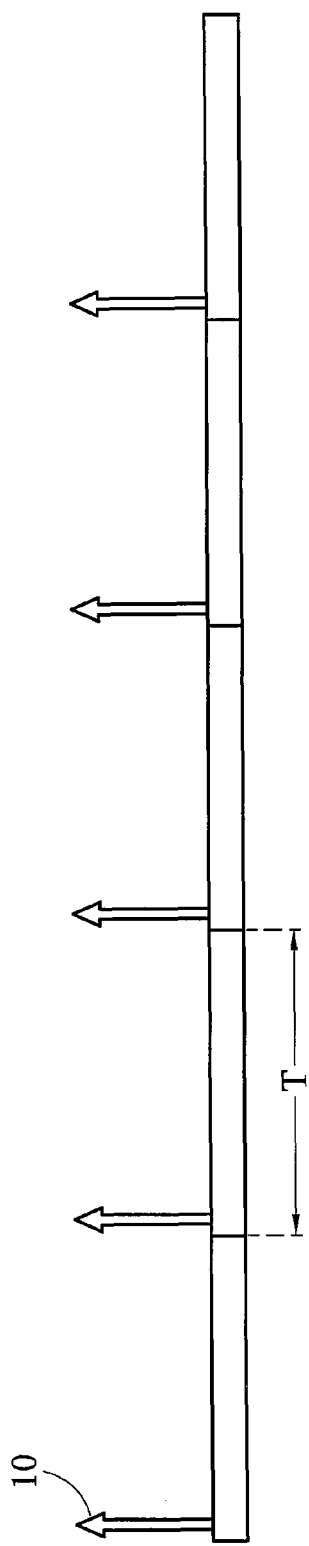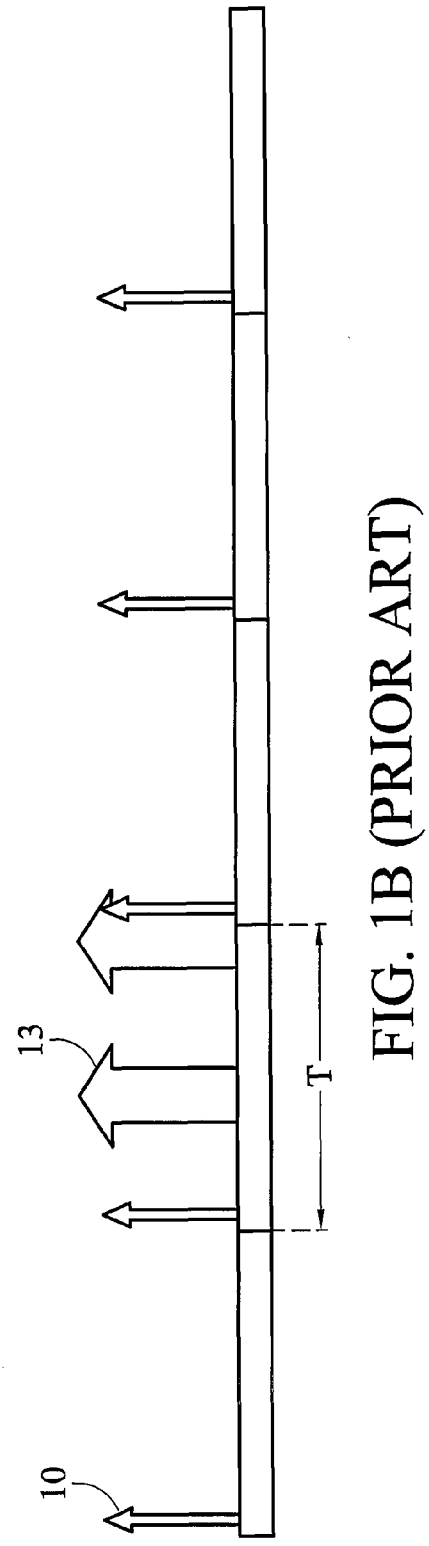

METHOD FOR BACKGROUND SCAN IN A MOBILE WIRELESS SYSTEM

CROSS REFERENCE TO RELATED APPLICATIONS

This application claims priority of U.S. Provisional Patent Application Ser. No. 60/829,884, filed Oct. 18, 2006. The contents of the provisional application are hereby incorporated by reference.

BACKGROUND

The invention relates to wireless local area networks (WLAN), and more particularly to a background scan mechanism for a mobile station in a WLAN.

This section is intended to introduce the reader to various aspects of the art, which may be related to various aspects of the invention, which are described and/or claimed below. This discussion is believed to be helpful in providing the reader with background information to facilitate a better understanding of the various aspects of the invention. Accordingly, it should be understood that these statements are to be read in this light, and not as admissions of related art.

According to a conventional handover mechanism, a handover operation is initiated by a mobile station (MS), such as a mobile phone, rather than an access point (AP). The mobile station performs a background scan to gather information to determine a time and target for the handover operation.

Conventionally, background scans and other applications may interfere with each other. For example, according to a real-time transport protocol (RTP), a RTP packet can carry any data with real-time characteristics, such as interactive audio and video. Referring to FIG. 1A, a RTP packet 10 is sent at intervals of T. For example, for VoIP (Voice over IP) data, T may be 20 ms (G.711 and G.729) or 30 (G. 723.1); for IPTV data, T may be at least 20 ms (AMR and AWB). For example, in a wireless network system comprising 14 WLAN channels, it takes 14 S to complete a round of background scan, wherein S is the time required for scanning one channel. Generally, S ranges between 7 ms and 11 ms. Accordingly, it takes 154 ms (11*14) to complete a round of background scan. In this case, if the priority is given to RTP packets 10, operations of background scan 13 may be interrupted by delivery of a RTP packet 10, as shown in FIG. 1B. On the other hand, if the priority is given to the background scan 13, delivery of the RTP packet 10 may be blocked by the background scan 13, as shown in FIG. 1C.

Therefore, a background scan mechanism is required to perform the background scan without interfering with other delivery operations.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention.

A method is disclosed, operating a mobile station in a wireless network system comprising a plurality of base stations allocated in N channels. Data packets are received at a time interval p from a first base station of the wireless network system to which the mobile station is currently connected. A first period T is provided for a complete background scan monitoring messages from the plurality of base stations located in the wireless network system. The complete background scan is divided into a plurality of partial scan sections, each of which monitors base stations of one of the N channels. A second period M is determined for the partial scan section according to the time interval p, the first period T, and the number of channels N.

A mobile station is provided, operating in a wireless network system comprising a plurality of base stations allocated in N channels. A communication unit receives data packets at a time interval p from a first base station of the wireless network system to which the mobile station is currently connected. A processor provides a first period T for a complete background scan monitoring messages from the plurality of base stations located in the wireless network system, divides the complete background scan into a plurality of partial scan sections, each of which monitors base stations of one of the N channels, and determines a second period M for the partial scan section according to the time interval p, the first period T, and the number of channels N.

BRIEF DESCRIPTION OF DRAWINGS

The invention can be more fully understood by reading the subsequent detailed description and examples with references made to the accompanying drawings, wherein:

FIGS. 1A-1C illustrate operations of a conventional background scan for a mobile station in a wireless local access network;

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve developer specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The invention is now described with reference to FIGS. 2 through 6, which generally relate to controlling a mobile station. In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the figures correspond to the Figure number, with the exception that the same reference number is used throughout to refer to an identical component which appears in multiple figures. It should be understood that many of the elements described and illustrated throughout the specification are functional in nature and may be embodied in one or more physical entities or may take other forms beyond those described or depicted.

The invention can be implemented in a mobile station connected to a wireless local area network operating according to the IEEE 802.11 standard.

Figure 1C:
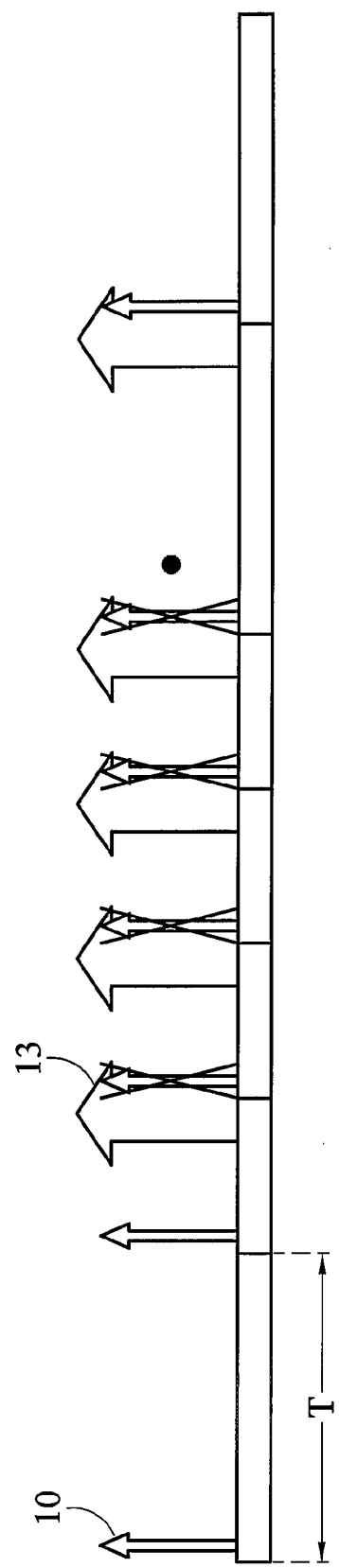
Figure 2:
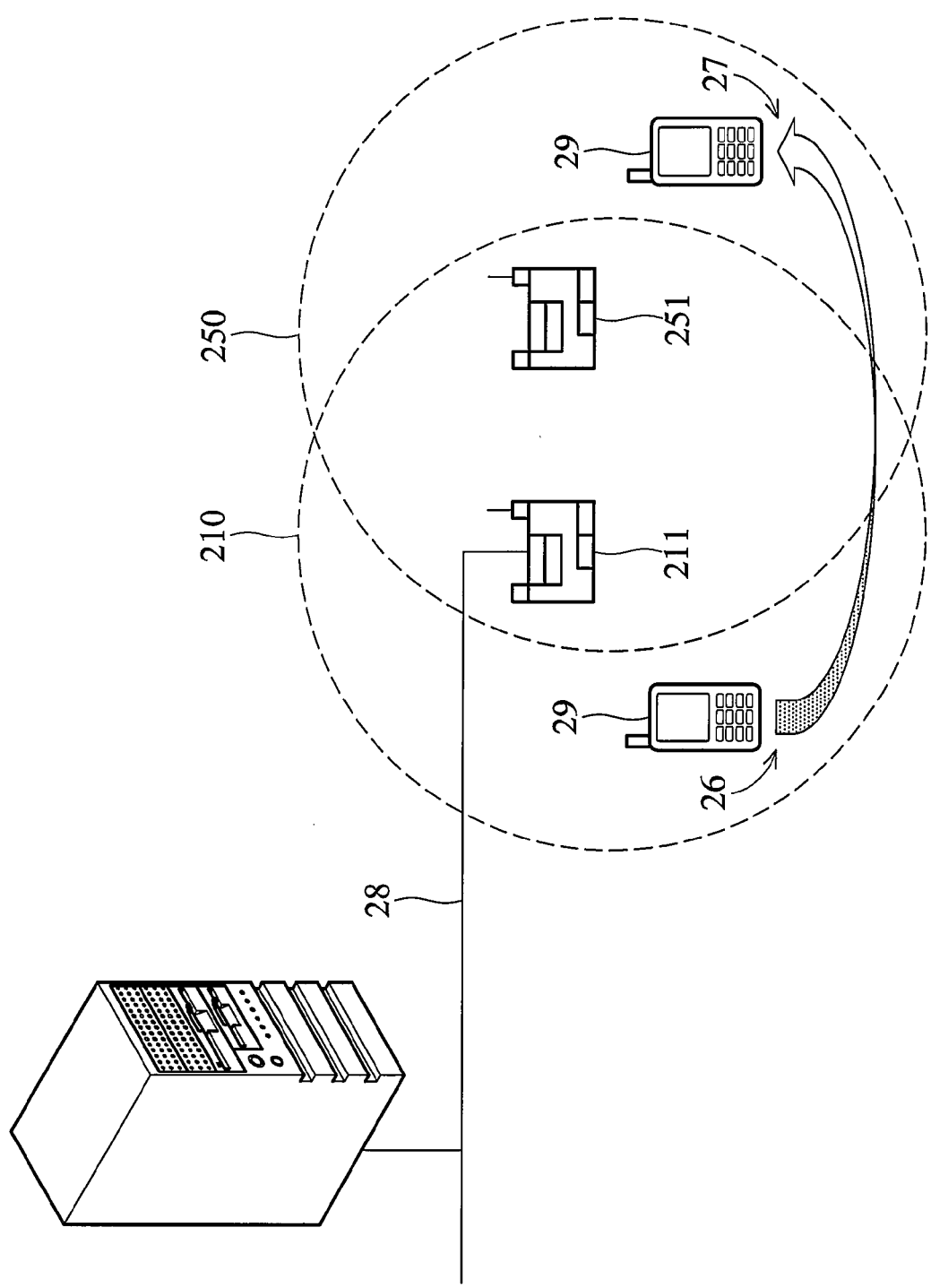
FIG. 2 is a schematic view of an embodiment of a wireless communication network.

FIG. 2 is a schematic view of an embodiment of a wireless communication network. FIG. 2 illustrates wireless local area networks (WLANs) 210 and 250. Devices capable of wireless communication can access WLANs 210 and 250 through base stations (access points) 211 and 251, respectively. Each of WLANs 210 and 250 comprises a plurality base stations (not shown) allocated in N channels, wherein N is a positive integral. Here, N can be 14.

WLAN 210 comprises base station 211 and client network card (not shown). Base station 211 connects to wired network backbone 28. Similarly, WLAN 250 comprises base station 251 and client network card (not shown). Multiple base stations may be arranged within a building or an important access site, enabling clients equipped with a WLAN network card to maintain uninterrupted connection even when moving. In this example, a mobile phone 29 comprising a wireless communication function can move from location 26 to location 27 using the wireless communication handover function. The handover function is performed based on information gathered by background scan monitoring messages from the plurality of base stations located in the wireless network system.

Figure 3:
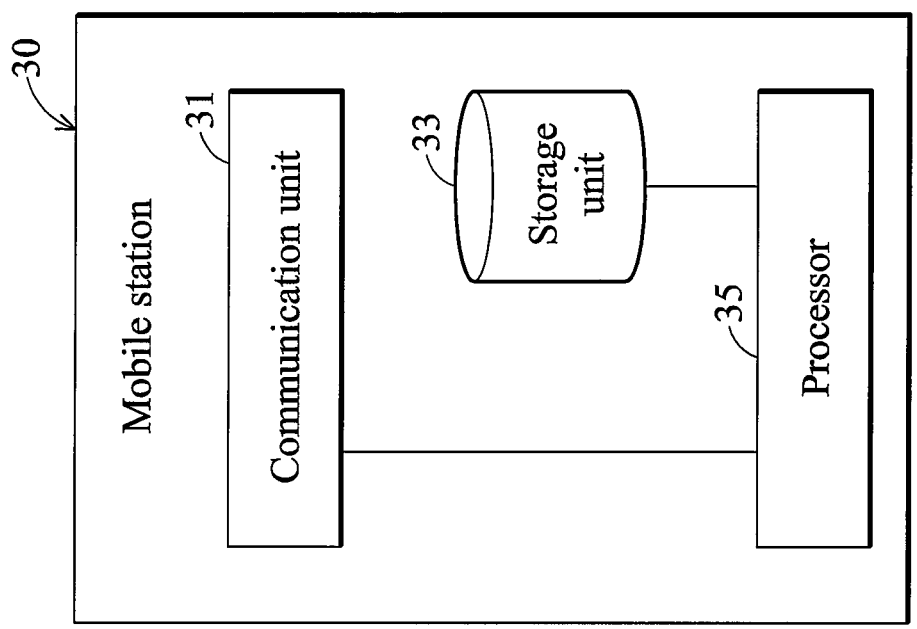
FIG. 3 is a block diagram of an embodiment of a mobile station.

FIG. 3 is a block diagram of an embodiment of a mobile station. A mobile station 30 operates in the wireless network system of FIG. 2. The mobile station 30 can be a mobile phone or other portable data processing device provided with a wireless transceiver. The mobile station 30 comprises a communication unit 31, a storage unit 33, and a processor 35. The communication unit 31 transmits data packets at a time interval p to a first base station of the wireless network system to which the mobile station is currently connected. The processor 35 provides a first period T for a complete background scan to monitor messages from the plurality of base stations located in the wireless network system, divides the complete background scan into a plurality of partial scan sections, each of which monitors base stations of one of the N channels, and determines a second period M for the partial scan section according to the time interval p, the first period T, and the number of channels N.

The monitored message can be a beacon message sent from each of the base stations regularly.

The processor 35 determines the second period M for the partial scan section according to the formula:

$$M \leq (T/N)/p \quad \text{(equation 1)}$$

M is the greatest integer less than $(T/N)/p$.

In addition, the first period T for a complete background scan can be further adjusted. The processor 35 further provides a minimal guard time Tg. During the minimal guard time Tg, no partial scan can be performed. In addition, the processor 35 will take the minimal guard time Tg into account when determining the second period M for the partial scan section. In some embodiment, the second period M for the partial scan section can be determined according to the formula:

$$M \leq [T/N]/p - Tg \quad \text{(equation 2)}$$

M is the greatest integer less than $\{[T/N]/p-Tg\}$.

The processor 35 further performs the partial scan section at the interval of the second period M to monitor messages from the base stations in one of the N channels. In addition, the processor 35 determines whether to perform a handover operation based on the messages monitored by the background scan.

The provided information used by the processor 35 in determining the second period M for the partial scan section can be stored in storage unit 33. Here, values of N, T, Tq, p are stored in storage unit 33.

Figure 4:
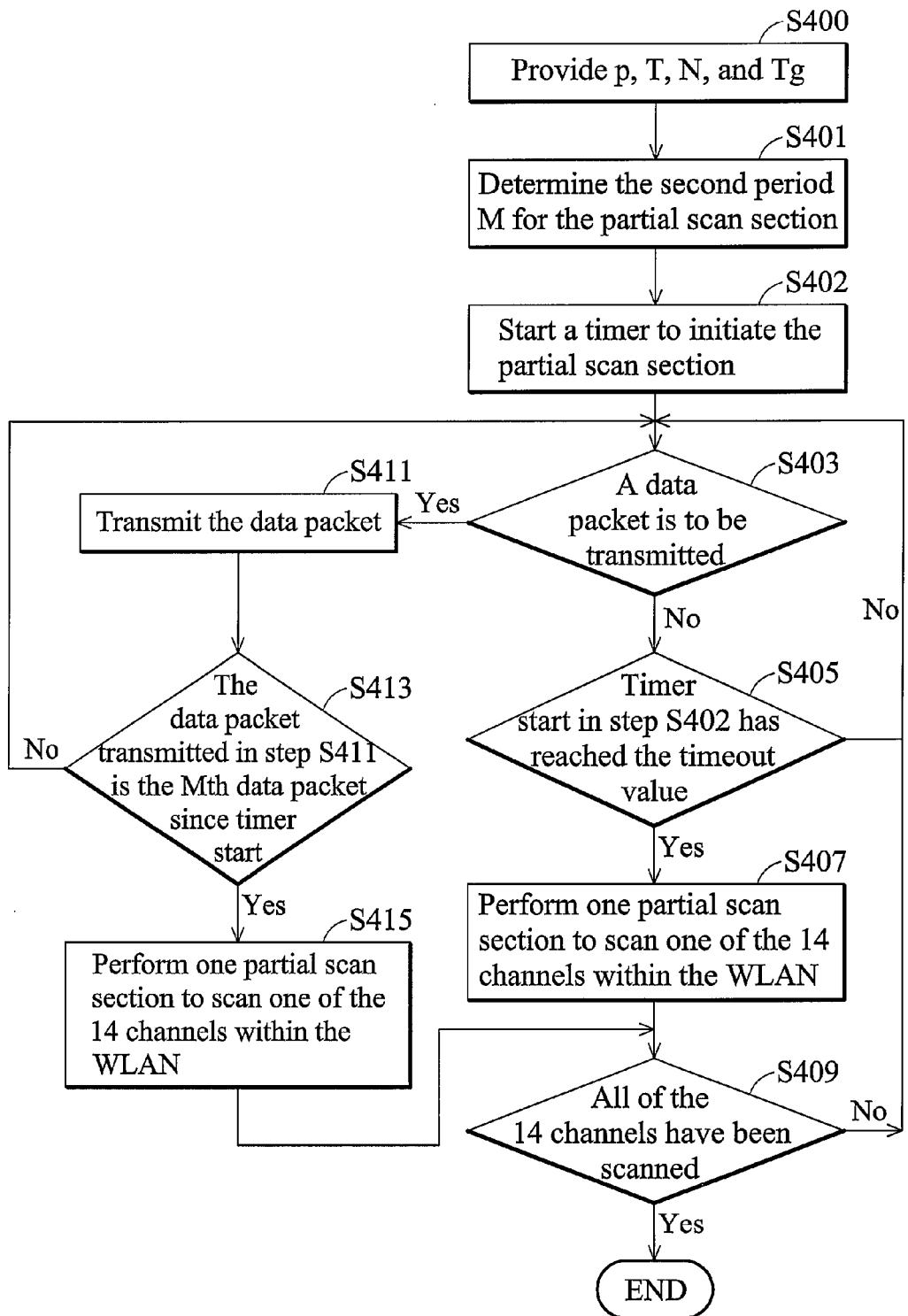
FIG. 4 is a flowchart of an embodiment of a background scan method for a mobile station connected to a base station within a WLAN.

FIG. 4 is a flowchart of an embodiment of a background scan method for a mobile station connected to a base station within a WLAN.

In step S400, the time interval p, the first period T, the number of channels N, and the minimal guard time Tg are provided.

Figure 5:
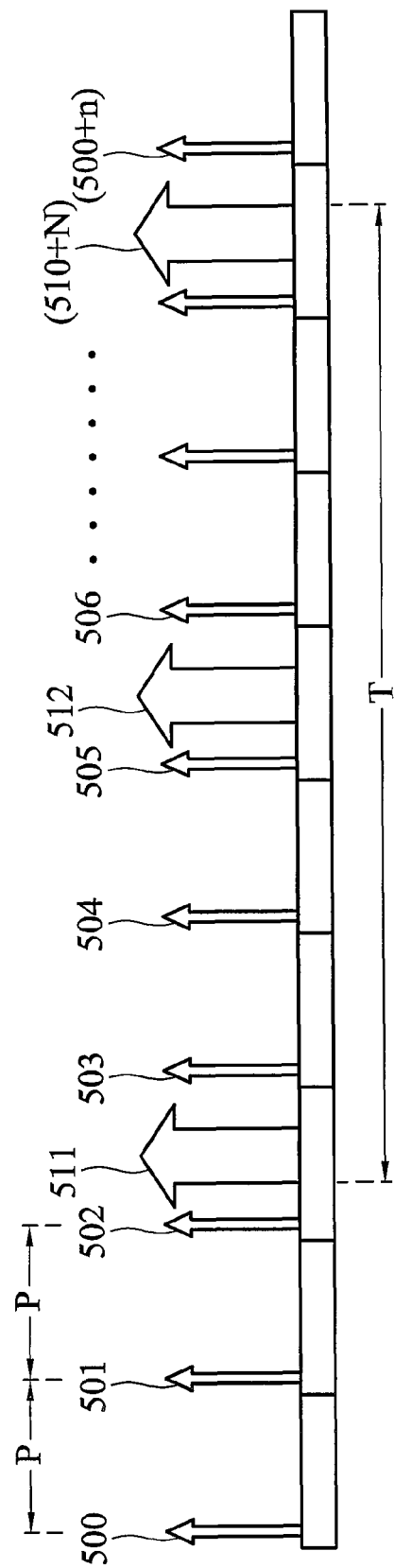
FIG. 5 illustrates data traffic manipulated by the mobile station.

FIG. 5 illustrates data traffic manipulated by the mobile station. Here, data packets 500, 501, 502, 503, 504, 505, 506, ... are transmitted to the base station at the time interval p. The WLAN comprises a plurality of base stations allocated in N channels. Here, N is 14. A complete background scan is performed at an interval of first period T. In other words, a complete background scan, i.e., background scan through channels 1, 2, . . . , 14, is performed every T milliseconds (msec).

In step S401, the second period M for the partial scan section is determined. During the Tmsec, a minimal guard time Tg is preserved from operation of the background scan. Accordingly, the time period available for background scan is ([T/N]/p−Tg). The second period M can be determined according to equation 1 (M≦(T/N)/p) or equation 2 (M≦[T/N]/p−Tg). For example, if M=3, a partial scan section is performed every 3 transmitted-data packets, as shown in FIG. 5. Each partial scan section scans one of the 14 channels within the WLAN, respectively.

In step S402, a timer is started to initiate the partial scan section. As described, one partial scan section is performed every M data packets. In addition, data packets are transmitted at an interval of p msec. Accordingly, one partial scan section is performed every (M*p)msec. The timeout value for the timer is (M*p)msec, which equals to T/N−Tg (msec).

In step S403, it is determined whether a data packet is to be transmitted, and if so, the method proceeds to step S411, otherwise to step S405.

In step S411, the data packet is transmitted.

In step S413, it is determined whether the data packet transmitted in step S411 is the Mth data packet. If yes, the method proceeds to step S415, otherwise, returns to step S403.

In step S415, because M data packets have been transmitted, one partial scan section is performed to scan one of the 14 channels within the WLAN. After the partial scan section is completed, the method proceeds to step S409 to determine whether all of the 14 channels have been scanned.

If there is no data packet to be transmitted in step S403, it is determined whether the timer started in step S402 has reached the timeout value (step S405). When (M*p) milliseconds have passed since the timer starts, the partial scan section is performed to scan one of the 14 channels within the WLAN (step S407). After the partial scan section is completed, the method proceeds to step S409 to determine whether all of the 14 channels have been scanned.

If all of the 14 channels have been completed, the method ends.

Figure 6:
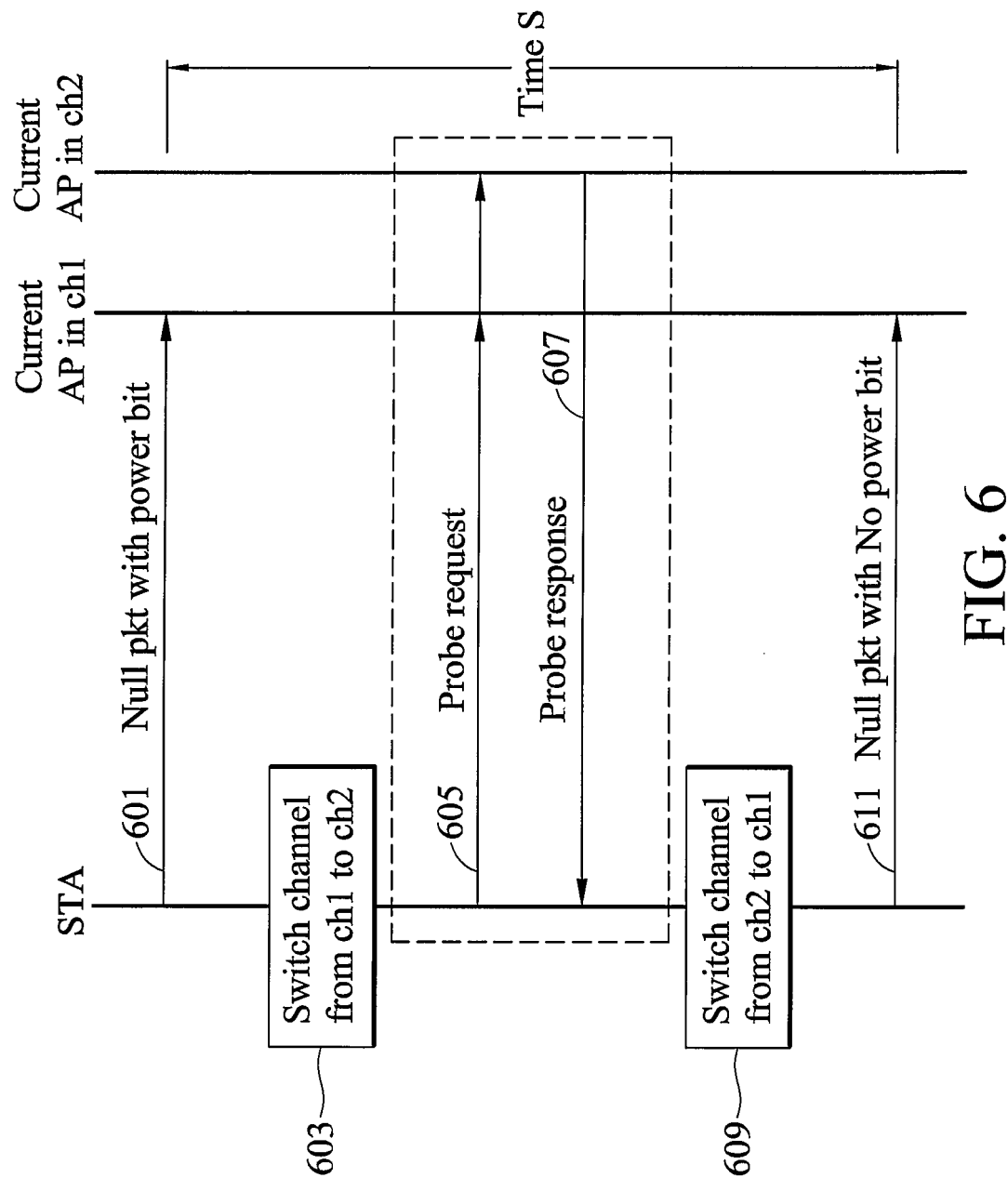
FIG. 6 is a schematic view of a background channel scan procedure.

FIG. 6 is a schematic view of a background channel scan procedure. In step 601, when a mobile station starts a background channel scan, the mobile station transmits a NULL packet with Power bit to current AP in Channel 1 to inform current AP that it will leave normal mode and switch to power saving mode. In step 603, the mobile station switches from Channel 1 to Channel 2 and prepares to search for other APs. In step 605, the mobile station transmits Probe Request broadcast packets to all new APs in Channel 2 and asks them to respond. In step 607, the mobile station waits for APs' response. The APs in Channel 2 may send Probe Response packets and beacons including their RSSI information back to the mobile station. The mobile station then checks if there are APs with RSSI exceeding current APs'. In step 609, the mobile station switches from Channel 2 back to Channel 1. In step 611, the mobile station transmits a NULL packet with NO Power bit to current AP in Channel 1 to apprise current AP that it returns to normal mode. This completes a background channel scan.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of operating a mobile station in a wireless network system comprising a plurality of base stations allocated in N channels, comprising:
   transmitting a data packet in a time interval p to a first base station of the wireless network system, wherein the first base station is the one the mobile station is currently connected to;
   providing a first period T for a complete background scan to monitor messages from the plurality of base stations of the wireless network system;
   dividing the complete background scan into a plurality of partial scan sections; and
   performing each partial scan section at the interval of every M data packets to monitor messages from the base stations of the N channels,
   wherein M is determined according to the time interval p, the first period T, and the number of channels N.

2. The method of claim 1, wherein the monitored message is a beacon message sent from each of the base stations regularly.

3. The method of claim 1, further determining the M data packets for the partial scan section according to the formula:

$$M \leq (T/N)/p,$$

wherein M is the greatest integer less than $[(T/N)/p]$.

4. The method of claim 3, further determining the M data packets for the partial scan section according to the formula:

$$M \leq \{[T/N]/p - Tg\},$$

wherein M is the greatest integer less than $\{[T/N]/p - Tg\}$.

5. The method of claim 1, further providing a minimal guard time Tg, wherein the minimal guard time Tg is a reserved duration where no partial scan is performed.

6. The method of claim 1, further determining whether to perform a handover operation based on the messages monitored by the background scan.

7. A mobile station operating in a wireless network system comprising a plurality of base stations allocated in N channels, comprising:
   a communication unit, transmitting a data packet in a time interval p to a first base station of the wireless network system, wherein the first base station is the one the mobile station is currently connected to; and
   a processor, providing a first period T for a complete background scan to monitor messages from the plurality of base stations of the wireless network system, dividing the complete background scan into a plurality of partial scan sections, and performing each partial scan section at the interval of every M data packets to monitor messages from the base stations of the N channels, wherein M is determined according to the time interval p, the first period T, and the number of channels N.

8. The mobile station of claim 7, wherein the monitored message is a beacon message sent from each of the base stations regularly.

9. The mobile station of claim 7, wherein the processor further determines the M data packets for the partial scan section according to the formula:

$$M \leq (T/N)/p,$$

wherein M is the greatest integer less than $[(T/N)/p]$.

10. The mobile station of claim 9, wherein the processor further determines the M data packets for the partial scan section according to the formula:

$$M \leq \{[T/N]/p - Tg\},$$

wherein M is the greatest integer less than $\{[T/N]/p - Tg\}$.

11. The mobile station of claim 7, wherein the processor further provides a minimal guard time Tg, wherein the minimal guard time Tg is a reserved duration where no partial scan is performed.

12. The mobile station of claim 7, wherein the processor further determines whether to perform a handover operation based on the messages monitored by the background scan.

* * * * *